(12) United States Patent
Ehrhart

(10) Patent No.: US 7,669,392 B2
(45) Date of Patent: Mar. 2, 2010

(54) HEADER HEIGHT CONTROL SYSTEM WITH FLOW DIVIDER CAPABILITY

(75) Inventor: Philip J. Ehrhart, Narvon, PA (US)

(73) Assignee: CNH America LLC, New Holland, PA (US)

( * ) Notice: Subject to any disclaimer, the term of this patent is extended or adjusted under 35 U.S.C. 154(b) by 168 days.

(21) Appl. No.: 11/728,762

(22) Filed: Mar. 27, 2007

(65) Prior Publication Data

US 2007/0170669 A1    Jul. 26, 2007

Related U.S. Application Data

(63) Continuation-in-part of application No. 11/332,030, filed on Jan. 13, 2006, now Pat. No. 7,603,837.

(51) Int. Cl.
    A01D 75/28    (2006.01)
    A01D 41/14    (2006.01)
    A01D 46/08    (2006.01)

(52) U.S. Cl. .................................. 56/10.2 E

(58) Field of Classification Search ............... 56/10.2 E, 56/11.9, 14.9–15.2, 15.9, 16.2, 208–212, 56/DIG. 11; 91/514–515
See application file for complete search history.

(56) References Cited

U.S. PATENT DOCUMENTS

| | | | | |
|---|---|---|---|---|
| 3,474,607 A * | 10/1969 | Burrough et al. | ............... | 56/209 |
| 3,714,767 A | 2/1973 | Hubbard et al. | ............... | 56/208 |
| 4,335,561 A | 6/1982 | Swanson et al. | ............. | 56/10.2 |
| 4,339,139 A | 7/1982 | Swanson | ................ | 280/43.23 |
| 4,407,109 A | 10/1983 | Swanson et al. | ............. | 56/11.9 |
| 4,838,013 A | 6/1989 | Louet Feisser et al. | ........ | 56/13.6 |
| 5,201,167 A | 4/1993 | Rowse | .............................. | 56/6 |
| 5,203,149 A | 4/1993 | Youngberg et al. | ........... | 56/14.9 |
| 5,297,745 A | 3/1994 | Vinyard | ................... | 241/101.7 |
| 5,507,139 A | 4/1996 | Delperdang et al. | ........... | 56/366 |
| 6,189,432 B1 * | 2/2001 | Colarelli et al. | ............... | 91/171 |
| 6,321,634 B1 * | 11/2001 | Yeo et al. | ...................... | 91/515 |
| 6,901,729 B1 * | 6/2005 | Otto et al. | ..................... | 56/208 |
| 7,144,069 B2 * | 12/2006 | Meyer et al. | ................. | 296/156 |
| 7,168,226 B2 * | 1/2007 | McLean et al. | ........... | 56/10.2 E |
| 2007/0012008 A1 * | 1/2007 | Fackler et al. | ..................... | 56/3 |

FOREIGN PATENT DOCUMENTS

DE        4023092        1/1992

* cited by examiner

*Primary Examiner*—Robert E Pezzuto
*Assistant Examiner*—Joan D Misa
(74) *Attorney, Agent, or Firm*—Patrick M. Sheldrake; John William Stader; Michael G. Harms

(57) ABSTRACT

A system and apparatus for controlling height of a header of a work machine such as an agricultural windrowing machine or a harvesting machine, which includes height control cylinders jointly or individually operable for raising or lowering the opposite ends of a header to achieve a desired overall height or angle of tilt in relation to the surface of a field or pasture to be cut, which allow the header to be raised, and lowered to the previously selected cut height, without changing the lengths of the cylinders, so as to be usable in combination with an optional header lift and/or float system, and including a flow divider capability which increases accuracy of height control, having particular utility for more precisely controlling the heights of the ends of the header, especially when subjected to uneven dynamic loading conditions, such as during rapid spin turns and the like.

15 Claims, 11 Drawing Sheets

HEADER HEIGHT CONTROL SYSTEM WITH FLOW DIVIDER CAPABILITY

This application is a continuation-in-part of U.S. application Ser. No. 11/332,030, filed Jan. 13, 2006 now U.S. Pat. No. 7,603,837.

TECHNICAL FIELD

This invention relates generally to a system and apparatus for controlling the height of a header of a work machine such as an agricultural windrowing machine or a harvesting machine, and more particularly, to a header height control system and apparatus which enables jointly or individually raising or lowering the opposite ends of a header to achieve a desired overall height and/or tilt in relation to the surface of a field or pasture, which can be used in combination with a lift and/or float system for the header, and including a flow divider capability which increases accuracy of height control, having particular utility for more precisely controlling the heights of the ends of the header, especially when subjected to uneven dynamic loading conditions, such as during rapid spin turns and the like.

BACKGROUND ART

Transversely or sidewardly extending, elongate headers of from about 12 feet to 30 feet and greater in length are commonly utilized on windrowing machines for cutting and windrowing crops such as cereal grains and other seed crops, as well as grasses. Historically, the headers rested on skid shoes which moved along the surface of a field or pasture, to position cutting apparatus of the header, such as an elongate sickle cutter bar or a row of disk cutters, close to the surface for cutting the stalks or stems of crops and grasses close to the surface.

More recently, it has become more desirable and customary to cut the stalks of crops higher than is possible with the header resting on skid shoes. Prior known models of windrowers used hydraulic cylinders to carry the header at the desired height with flotation springs carrying a major percentage of the header weight. Newer generations of windrowers use hydraulic cylinders and accumulators to lift the header and also provide header flotation when the header is lowered to the ground in a cutting mode. Such newer generation windrowers have been found to be efficient for cutting hay crops, but some have no provision for carrying the header above the ground while also providing a flotation capability. A flotation capability is desirable on a header carried off the ground to allow the header to be guided over obstacles and uneven ground without damaging the cutting apparatus of the header.

A settable sideward tilt capability has also been found to be a desirable feature, as it allows for accommodating uneven terrains such as where one side of a swath of a field or pasture to be cut is higher than the other. It may also be desirable to leave stubble on a field or pasture cut at an angle so as to retain more driven snow for better moisture retention when the snow melts. Similarly, in some circumstances it can be desirable to have the capability to independently raise and lower the ends of a header to correct for undesired sideward or transverse tilt. And, in many instances, it is desirable to have the capability to easily return to an earlier selected cut height, and tilt, after lifting of the header.

It has also been found that controlling of the lateral orientation of the header, whether a level or tilted orientation, when using a height control system is dependent upon the system being able to maintain an even header position during the raise and lower operations. For example, when using wider headers, such as a draper type header, which can be up to 36 feet wide, precise control over left and right lift arm movement is desired because small changes in lift arm position create greater height changes at the ends of the header. Likewise a greater precision is required on counterbalance when using a parallel circuit type lift system wherein the lift cylinders are jointly connected in parallel to the pressurized fluid source. Because of the parallel connection of the cylinders, a shortcoming that has been observed is that the dynamic forces generated during spin turns at the end of a cut or swath can cause the header to lean, even if the header is not being raised during the turn. These same forces generated during spin turns at the end of a cut or swath are a particular problem when using a wider header, as they have been observed to cause the wider header to lean if the header is being raised during the turn.

Thus, what is sought is a header height control system and apparatus for a work machine such as an agricultural windrowing machine or a harvesting machine, which provides a height control capability in combination with a float capability and a sideward or transverse tilt capability, along with a return to previously selected cut height capability, and which otherwise overcomes one or more of the shortcomings and limitations set forth above.

SUMMARY OF THE INVENTION

What is disclosed is a height control system and apparatus for a header of a work machine such as an agricultural windrowing machine or a harvesting machine, which provides both a height control capability and a lateral or sideward tilt capability, and which can be used in combination with an optional float capability and a capability to return to a previously selected cut height after lifting, and which utilizes a flow divider and control valve arrangement to allow more precisely controlling the height of the ends of the header, particularly when external dynamic forces are exerted thereagainst, such as during rapid spin turns and the like, so as to overcome one or more of the problems and shortcomings set forth above.

According to a preferred embodiment of the invention, for a lift control system, such as those commonly used with auger type headers, a flow divider and control valve arrangement is incorporated into a header lift control cylinder circuit having parallel controlled left and right lift cylinders, between a control valve arrangement or other device, and the lift control cylinders. For a height control system having independently controllable left and right lift control cylinders, the flow divider and control valve arrangement is preferably incorporated into the header height control system.

According to another preferred embodiment of the invention, the flow divider and control valve arrangement includes a flow divider automatically operable for controlling the flow to the respective control cylinders in a predetermined manner, such as equally, and two control valves, each of which is controllably operable in a closed mode, and in an open mode. The first control valve is preferably disposed in connection with fluid paths or lines in connection with the two control cylinders. The second control valve is preferably disposed between the flow divider and one of the control cylinders. The control valves are operable in a first mode wherein the first control valve is closed and the second control valve is open, to allow fluid flow to the control cylinders in the predetermined manner. The control valves are operable in a second mode wherein they are both open, to allow free fluid flow between the control cylinders. And, the control valves are operable in a third mode wherein both control valves are closed, to prevent fluid flow to and from cylinders. The control valves are preferably automatically controllably operable in the prescribed modes by a control system in connection therewith over a suitable conductive path, for instance, by a controller of the lift and/or height control system of the machine, responsive to inputted operator commands to the controller for varying the length of the cylinders for raising and lowering the header.

As an example, the controller can be programmed to automatically controllably operate the control valves in the first mode during a start of a lift movement, such that pressurized fluid will be delivered to the control cylinders in the predetermined manner, and if the operator control is held in the lift position for a prescribed period, the controller will automatically control the control valves to operate in the second mode, allowing free flow between the control cylinders for equalizing the positions or lengths thereof. This sequence of modes of operation can also be utilized in a lowering movement, for controlling flow of fluid from the control cylinders.

The controller can also be programmed so as to automatically operate the control valves in the second mode for a header remove mode. Still further, the controller can be programmed for utilizing the third mode when the control cylinders are to be maintained in a selected position, such as when an operator is executing a rapid spin turn.

According to still another preferred aspect of the invention, the work machine can be an agricultural windrowing machine, a harvesting machine, or the like.

DETAILED DESCRIPTION OF THE INVENTION

Figure 1:
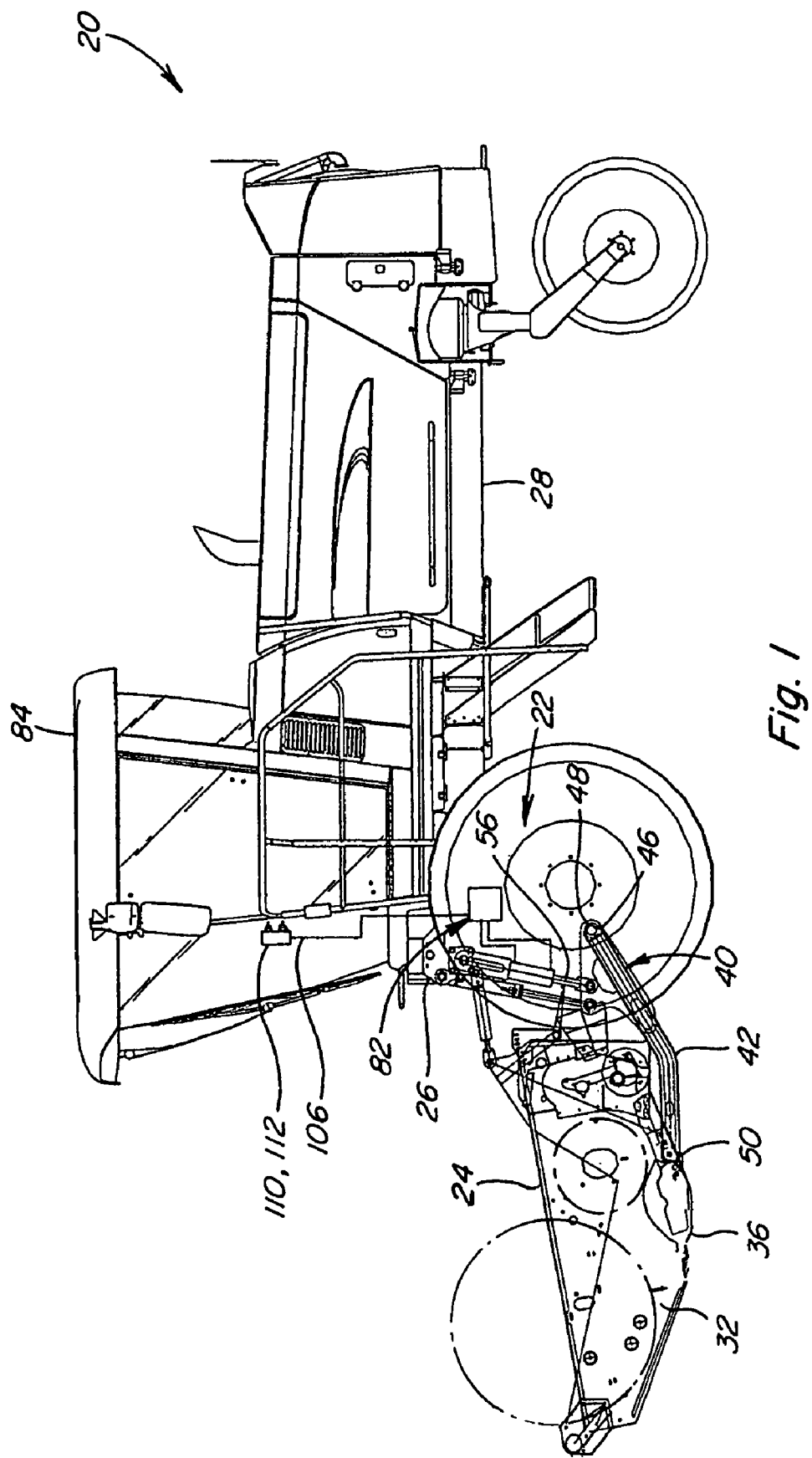
FIG. 1 is a side view of a representative windrowing machine including a header height control system and apparatus of the invention.
Figure 2:
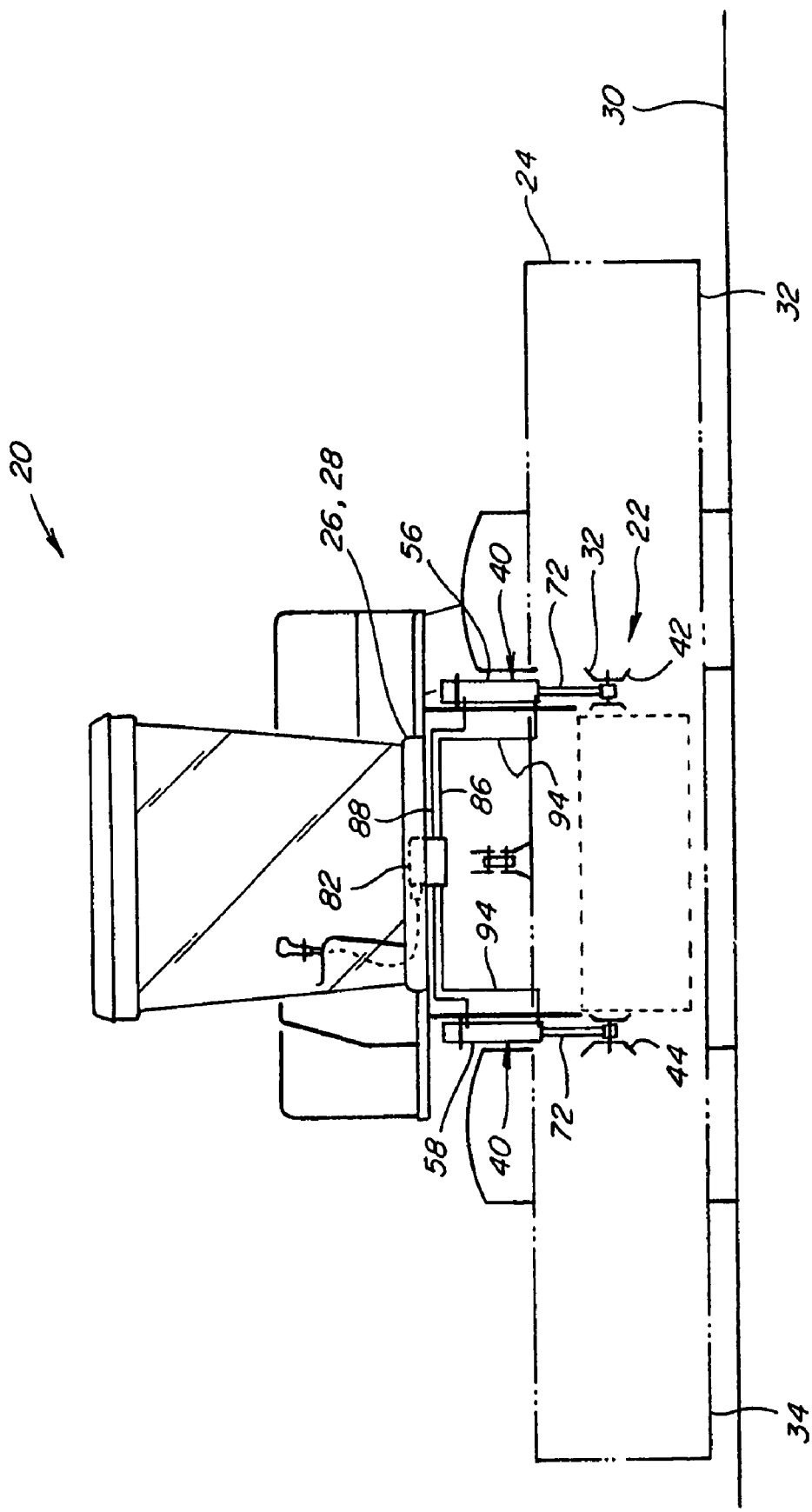
FIG. 2 is a simplified schematic front view of the machine of FIG. 1.

Referring now to the drawings, in FIGS. 1 and 2, an agricultural windrowing machine 20 is shown, including a header height control system 22. Header height control 22 is operable for controllably moving a header 24 supported on a front end 26 of machine 20, upwardly and downwardly, through a range of height positions in relation to a frame 28 of machine 20, and for holding header 24 at a selected height position so as to prevent downward movement from that position. While holding header 24 at a selected position, height control system 22 will still allow upward movement of the header, for such purposes as to facilitate passage over raised regions of the terrain and obstacles and the like, and to allow lifting the header for purposes such as facilitating turning machine 20 at the end of a swath through a field or pasture, travel over roads and lanes, and other purposes, with the capability to precisely return to the previously selected height, from the raised or lifted position, without having to manually seek that height.

Windrowing machine 20 is intended to be representative of a wide variety of windrowing machines, as well as crop harvesting machines and other work machines having a header which is desired or required to be positioned at one or more selectable heights and angles of sideward tilt in relation to the machine itself, as well as to a surface over which the machine is driven, such as the surface of a field or pasture containing crops or grasses to be windrowed, which surface is represented here by line 30 in FIG. 2 and in subsequent figures.

Header 24 is of conventional, well known construction, and is an elongate structure of sheet metal or similar construction extending transversely or sidewardly across the front of machine 20 and including opposite first and second end portions 32 and 34. A front, lower portion of header 24 extending between end portions 32 and 34 includes cutting apparatus 36, which can be, for instance, an elongate cutter or sickle bar, or a plurality of disk type cutters, constructed and operable in the well known, conventional manner, for severing stalks of plants, such as grains and grasses from a field or pasture over which machine 20 is moved, for gathering and deposition onto the surface of the field or pasture in a windrow, as is also well known in the art. The lower portion of header 24 can also include skids (not shown) for supporting the lower portion of header 24 and cutting apparatus 36 in close proximity to the surface of a field or pasture in the well known manner.

Here, it is noted that as an alternative to using skids in the conventional manner to support header 24 and cutting apparatus in close proximity to a field or pasture, it has been found that it can be advantageous to position cutting apparatus 36 at some height above the surface of a field or pasture, for reasons such as to avoid the occurrence of possible damage to cutting apparatus 36, such as can result from contact with objects such as rocks or field stones that may be located on the surface of the field or pasture, and for leaving stubble on the field of a particular height, for instance, for purposes such as for retaining snow for later melting and absorption into the soil of the field or pasture, or minimizing the amount of straw that must be processed by the combine. Whether in close proximity to or at a raised height above the surface of a field or pasture, it is also advantageous for header 24 to still be movable upwardly, for instance, so as to be able to move over obstacles on the surface of the field or pasture, and over elevated regions of a swath, and also to have the capability to lift or raise the header from the selected position when the end of a swath over a field or pasture is reached, for turning machine 20 around for alignment with another swath, and for travel over public and/or private roads, paths, or driveways, and the like. It is also advantageous after raising the header, to have the capability to lower the header to the same cut height position that was selected prior to raising the header, without having to manually seek the previously selected cut height.

Still further, in some instances, it has also been found to be advantageous to have the capability of orienting and holding a header such as header 24 at a transverse or sideward tilt in relation to its normal, generally overall even position in relation to machine 20 and a surface over which it is driven, for purposes such as cutting crops or grasses at an angle such that one side of a swath is higher than the opposite side, which may be desirable, for instance, for better retaining driven snow, or for facilitating windrowing over a sideward incline, or for passage over a swath of a field or pasture where one side of the swath is higher than the other. As explained hereinbelow, header height control system 22 is operable for providing these capabilities. That is, system 22 is controllably operable for positioning header 24 at a desirable overall height in relation to machine 20 and a surface on which it is located, while allowing lifting of the header as required or desired for passage over obstacles, end of swath turns and travel over roads and the like. System 22 is also controllably operable in a tilt mode for varying the transverse or sideward angular orientation or tilt of header 24 relative to frame 28, for instance, so as to be sidewardly tilted in relation thereto, and also to reduce or eliminate sideward tilting of the header relative to the frame, that is, to correct an undesired tilt, for instance, resulting from conditions wherein wheels on one side of machine 20 are lower than those on the other side, such as when moving through a rut, swail, depression, or the like.

Figure 3:
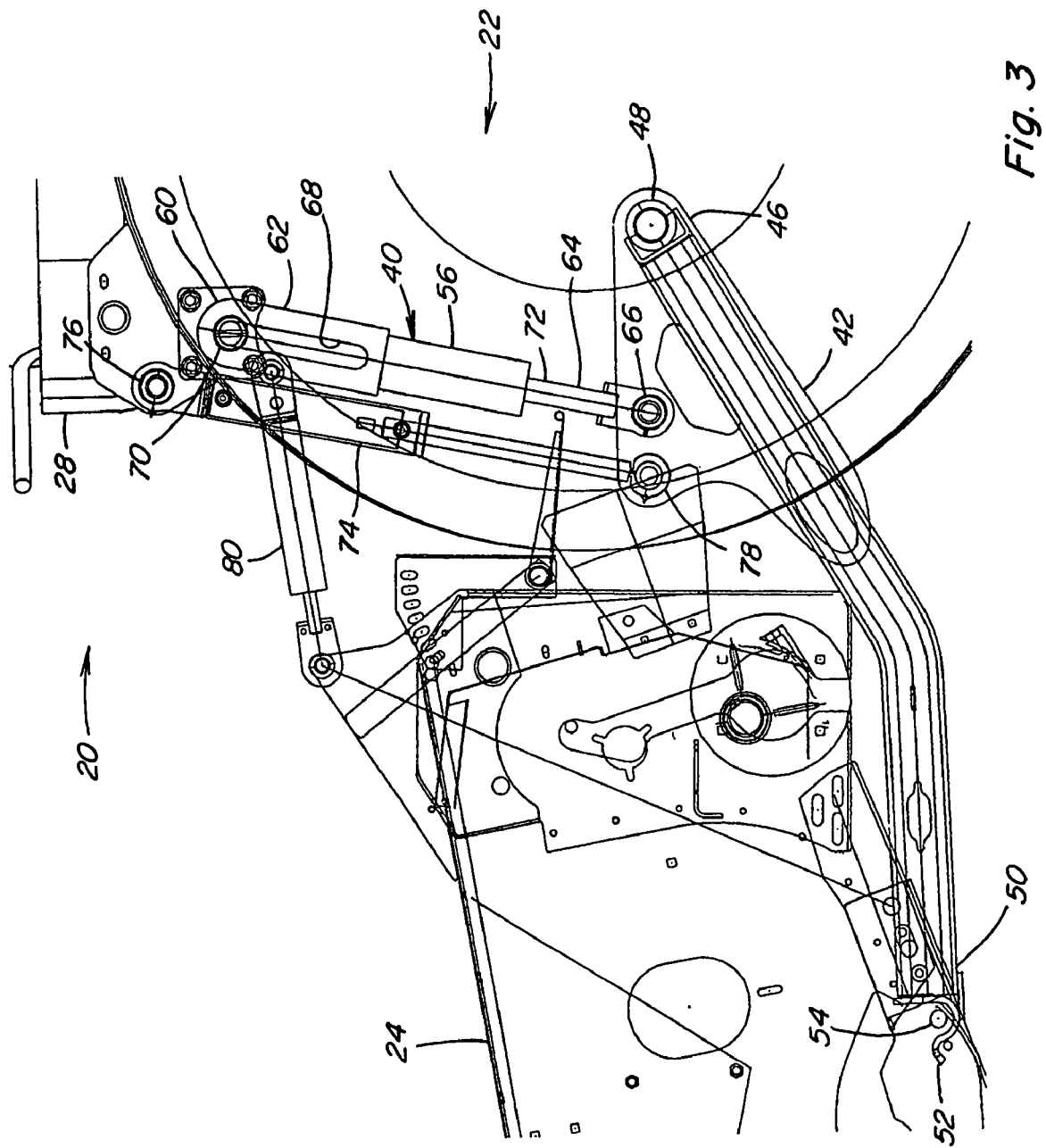
FIG. 3 is an enlarged, fragmentary simplified schematic side view of the front end of the machine, showing elements of the apparatus of the invention for positioning the header of the machine at a first position.
Figure 4:
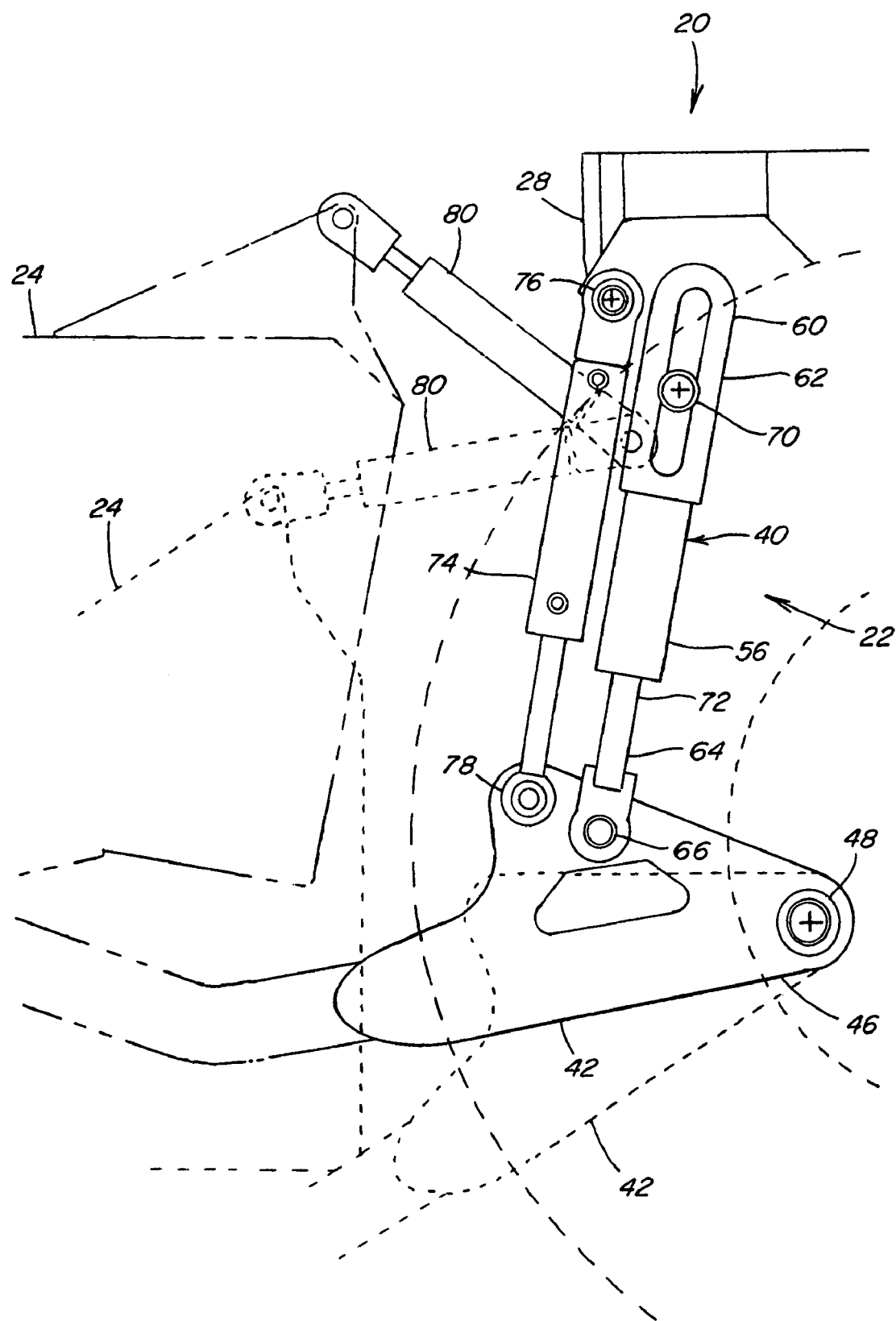
FIG. 4 is another enlarged, fragmentary simplified schematic side view of the front end of the machine, illustrating the header lifted by a lift cylinder of the machine.
Figure 5:
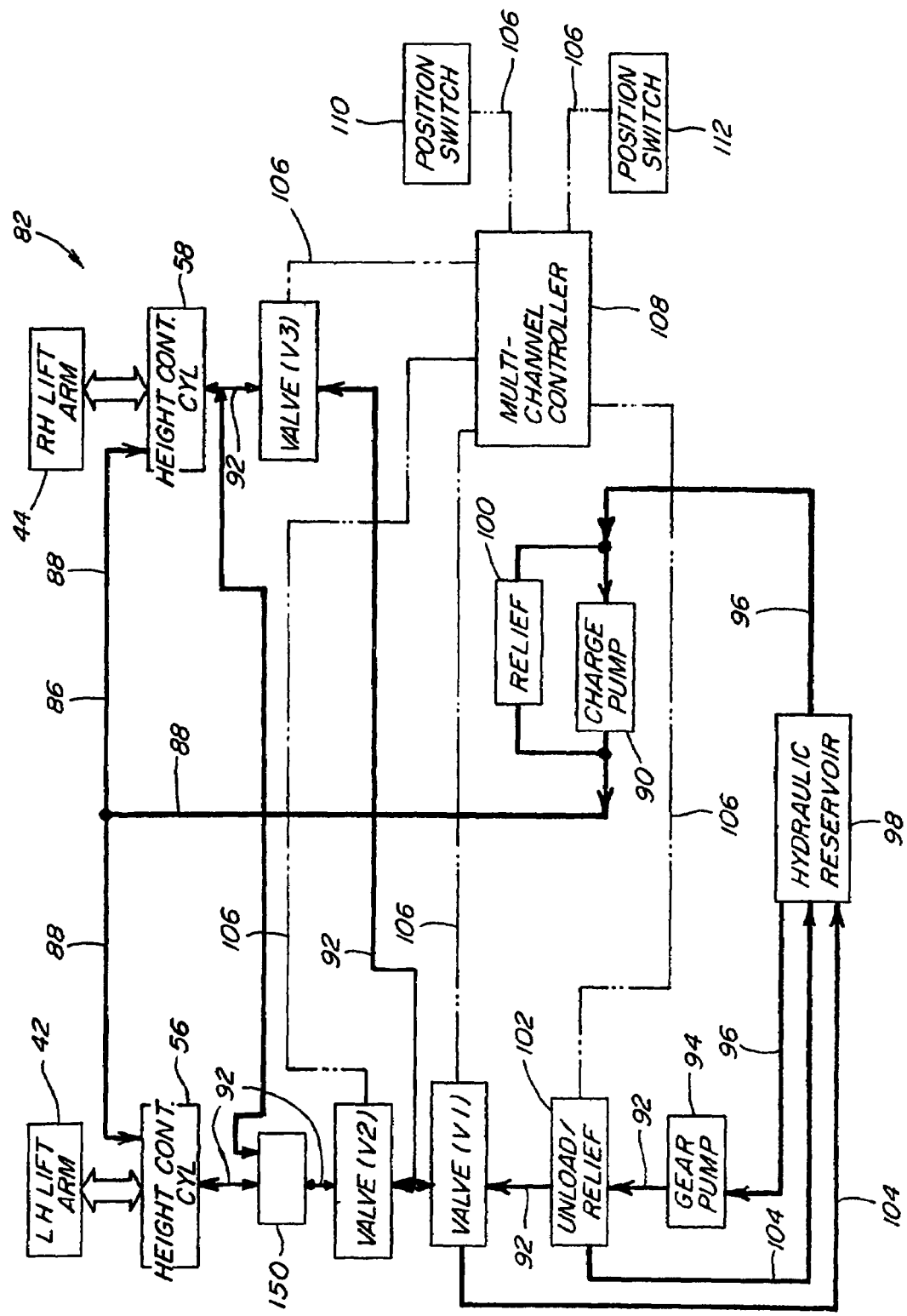
FIG. 5 is a simplified schematic representation of elements of the apparatus and a fluid control circuit of an operator control system of the invention.

Referring also to FIGS. 3, 4 and 5, header height control system 22 includes header support apparatus 40 connecting header 24 to frame 28 of machine 20 for upward and downward movement in relation thereto, and for holding header 24 in a selected height position. Additionally, apparatus 40 is operable for effecting sidewardly or laterally tilting header 24 as desired or required for a particular application, and for adjusting, reducing, or eliminating tilting. Apparatus 40 preferably includes a pair of elongate lift arms 42 and 44 or other suitable structure, pivotally connected to opposite sides of front end 26 of frame 28 so as to extend forwardly therefrom. Each lift arm 42 and 44 includes a first end portion 46 connected by a pivotal connection 48 to the side of frame 28 for upward and downward movement of the lift arm in relation thereto, and a second end portion 50 disposed forwardly of frame 28 and including a lift hook 52 or other suitable element adapted for cooperatively receiving a lift pin 54 on a respective end portion 32 or 34 of header 24, or otherwise connecting to header 24, for raising or lowering that end portion of header 24.

Header support apparatus 40 additionally preferably includes first and second height control cylinders 56 and 58 located adjacent to the opposite sides of frame 28 and pivotally connected thereto and to the first and second end portions 32 and 34, respectively, of header 24. Referring more particularly to FIGS. 3 and 4, each of the height control cylinders 56 and 58 preferably includes a first end portion 60 connected by a slotted connection 62 to frame 28, and an opposite second end portion 64 connected by a pin 66 to lift arm 42 or 44, adjacent first end portion 46 thereof. Slotted connection 62 of each cylinder 56 and 58 preferably includes an elongate slot 68 which cooperatively receives a pin 70 for longitudinal movement therein, as illustrated by the different positions of pin 70 in slot 68 as shown in FIGS. 3 and 4. Each of cylinders 56 and 58 includes a rod 72 extendible therefrom for pivotally moving the respective lift arm 42 or 44 downwardly in relation to frame 28, and retractable for raising the arm 42 or 44. Lowering of the respective lift arm 42 or 44 will correspondingly lower the respective end portion 32 or 34 of header 24 supported thereby, and raising arm 42 or 44 will raise the corresponding end portion 32 or 34. In this way, the height of respective end portions 32 and 34 of header 24 relative to frame 28, and also to a surface below header 24, such as denoted by line 30 in FIG. 2, can be maintained, thus preventing movement or falling of the respective end portion 32 or 34 below the selected height position. However, slotted connection 62 of each cylinder 56 and 58 allows upward movement of the respective end portion 32 and 34 from the selected height position by virtue of the ability of the cylinder 56 or 58 to move upwardly relative to pin 70 disposed in slot 68 of connection 62. As noted above, such upward movement of end portion 32 or 34 of header 24 can result from contact with a raised or elevated portion of a surface over which header 24 is moved, resulting from uneven terrain or the like, contact with obstacles such as rocks or stones that may be present on or project upwardly from the surface of a field or pasture, or the like. Upward movement can also occur as a result of intentional lifting of header 24, such as is typically desired when the end of a swath through a field or pasture is reached, to facilitate turning of machine 20. This capability is best illustrated by the alternative positions of lift arm 42 and header 24 illustrated in dotted and phantom lines in FIG. 4.

Here, it should be noted that such anticipated upward movements of lift arms 42 and 44 and first and second end portions 32 and 34 of header 24 can be yieldably resisted or effected by one or more optional lift cylinders or float apparatus that can be provided in association with height control system 22. For example, machine 20 is shown including a pair of lift control cylinders 74 disposed adjacent to and generally parallel to height control cylinders 58 and 56. Each lift control cylinder 74 is pivotally connected to the corresponding side of frame 28 by a pivotal connection 76, and to lift arm 42 or 44 by a pivotal connection 78. In a float mode, lift control cylinders 74 can be operated to partially support lift arms 42 and 44, and thus end portions 32 and 34 of header 24, and can also provide a desired degree of resilient resistance to upward movement thereof. In a lift mode, cylinders 74 can be actuated to retract such that a connected end portion 32 or 34 of header 24 is lifted or raised from the selected height position as established by the respective height control cylinder 56 or 58. Importantly, by virtue of slotted connections 62, height control cylinders 56 and 58 allow such upward movement without requiring changing the lengths of the height control cylinders. In this regard, slots 68 are preferably sufficiently long to allow substantially full extension and retraction of cylinders 74, as illustrated. As a result, first and second end portions 32 and 34 of header 24 can be jointly, or individually, raised and lowered relative to frame 28 to achieve a desired or selected height, while also providing optional float and lift capabilities for the respective end portions.

Here, it should also be recognized that forward and rearward tilt and/or orientation of header 24 can be controlled or varied, as desired or required for a particular application, by a fore and aft tilt cylinder 80 or other suitable apparatus provided for this purpose and operable in the well known manner. It should also be recognized and understood that although it is preferred to provide individual lift control cylinders 74 in association with the respective height control cylinders 56 and 58, a single lift control cylinder or other lift apparatus could be utilized, as desired or required for a particular application. Apparatus can also be provided (not shown) for locking header 24 in a raised position for compliance with regulations governing travel over public roads.

Referring also to FIGS. 1 and 5, height control system 22 of the invention additionally preferably includes an operator control system 82 controllably operable by an operator in an operator cab 84 of machine 20, for effecting upward and downward movements of header 24, including tilting movements thereof, as desired or required for a particular application. Operator control system 82, preferably includes a fluid control circuit 86 in connection with height control cylinders 56 and 58, including fluid lines 88 connecting upper ends of height control cylinders 56 and 58 with a charge pump 90, and fluid lines 92 connected to lower ends of cylinders 56 and 58 and a gear pump 94 through a series of valves controllably operable for distributing pressurized fluid to the cylinders as required for effecting desired movements thereof as will be explained hereinafter. Charge pump 90 and gear pump 94 both have suction ends connected by fluid lines 96 to a hydraulic reservoir 98 and will typically be constantly in operation during operation of machine 20 for providing supplies of pressurized fluid to cylinders 56 and 58 upon command. Here, it should be noted that although pump 94 in the preferred embodiment is identified as a gear pump, pump 94 could alternatively be a piston pump, a gerotor pump, or other suitable high pressure pump. A pressure relief valve 100 is connected to fluid lines 88 and 96 in parallel relation to charge pump 90 to allow fluid circulation and flow to reservoir 98 if the fluid output of pump 90 is dead headed or severely restricted and when fluid is displaced from the upper end of either of cylinders 56 and 58. An unload/relief valve 102 is disposed in fluid line 92 between gear pump 94 and cylinders 56 and 58, and is connected to hydraulic reservoir 98 by a fluid return line 104. Valve 102 is automatically operable in a relief mode to return fluid pumped by pump 94 to reservoir 98 in the event of dead heading or severe restriction of the output of that pump. A valve denoted at V1 is also disposed in fluid line 92, between unload/relief valve 102 and cylinders 56 and 58, and has a port connected to reservoir 98 by a fluid return line 104. A valve V2 is disposed in line 92 between valve V1 and cylinder 56, and a valve V3 is disposed in line 92 between valve V1 and cylinder 58. Unload/relief valve 102, and valves V1, V2 and V3, are each connected by a conductive path 106 to a multi-channel controller 108, which is preferably a microprocessor or other suitably based controller, operable outputting commands or otherwise for changing the positions or operating states of the valves, respectively. Conductive paths 106 can be, for instance, wires of a wiring harness, optical signal paths, or wireless paths, as desired or required. Controller 108, in turn, is connected by conductive paths 106 to one or more operator input devices, which can be, for instance, a pair of hand or foot operable position switches 110 and 112, operable for inputting operator commands to or otherwise controlling controller 108. Position switches 110 and 112 are preferably located in operator cab 84 as generally illustrated in FIG. 1. A flow divider and control arrangement 150 of the invention is shown in FIG. 5 disposed between valve V2 and the lower ends of cylinders 56 and 58, and is operable in the manner described below, for providing improved controllability and precision of operation of header height control system 22.

In operation, operator control system 82 is operator controllable in height and tilt setting modes using position switches 110 and 112 to retract and extend cylinders 56 and 58 jointly or individually, for effecting corresponding upward and downward movements of lift arms 42 and 44, for moving end portions 32 and 34 of header 24 upwardly and downwardly, as desired or required for selecting or setting a desired overall height and/or sideward tilt of header 24. Once a selected height position and/or tilt of header 24 is achieved or reached, operation of switches 110 and 112 can be discontinued, and height control system 22 will hold the header at that height and/or tilt. That is, system 22 will essentially prevent header 24 from falling or moving below the selected height. Upward movement is still allowed, however, as slotted connections 62 of each of respective cylinders 56 and 58 allow those cylinders to be lifted or raised without changing the length thereof, which enables end portions 32 and 34 to be raised or lifted from the selected height, for instance, as a result of contact between header 24 and raised portions of a surface over which header 24 is being moved, obstacles, and the like, or from lifting of one or both of the end portions by one or both lift control cylinders 74, as discussed above. Examples of various of the possible operating modes of operator control system 82 of height control system 22 are discussed hereinafter and illustrated in FIGS. 6-13.

Figure 6:
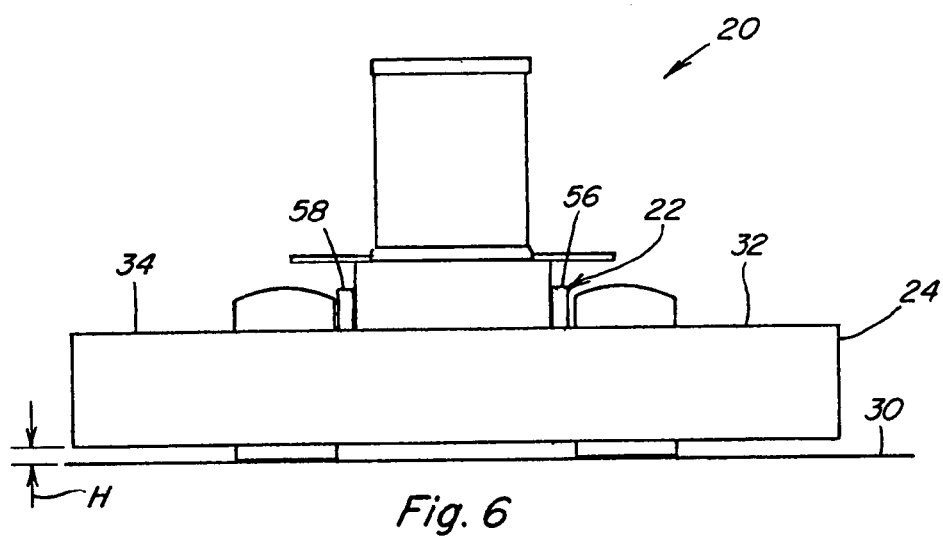
FIG. 6 is a simplified schematic front view of the machine, showing the header thereof positioned at a selected height above a surface therebelow.
Figure 7:
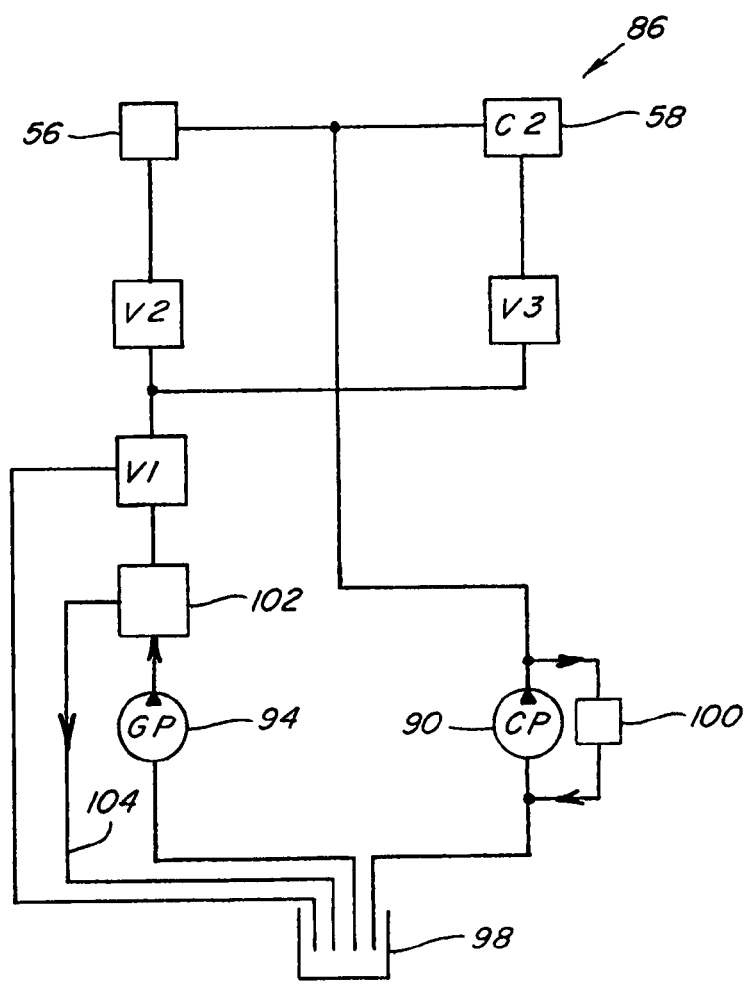
FIG. 7 is a simplified schematic representation of the fluid control circuit and apparatus of FIG. 5 in an operating mode for holding the header as illustrated in FIG. 6.

Referring to FIG. 6, machine 20 is illustrated with each of end portions 32 and 34 of header 24 supported by height control system 22 at a selected height H above a line 30 therebelow representative of the surface of a field or pasture over which header 24 is to be moved or is moving. Referring also to FIG. 7, fluid control circuit 86 is illustrated in simplified form in an operating mode which is a holding mode, for controlling cylinders 56 and 58 for holding header 24 at a selected height position, such as the height H illustrated in FIG. 6. In this mode, unload/relief valve 102 is commanded by controller 108 (FIG. 5) to operate in its relief mode to direct fluid continuously pumped by gear pump 94 through fluid return line 104 back to reservoir 98, such that fluid from that pump is not directed to either of fluid cylinders 56 and 58. Valves V2 and V3 are commanded to close, such that no fluid is allowed to escape from the lower portions of cylinders 56 and 58, and such that fluid pumped by charge pump 90 is unable to extend either of the cylinders, and instead, is circulated through relief valve 100. As a result, fluid cylinders 56 and 58 are each maintained or locked at the length selected by an operator using position switches 110 and 112 (FIGS. 1 and 5), but header 24 is still movable upwardly by virtue of the slotted connections 62 (FIGS. 3 and 4). Again, such upward movement can be effected by contact between header 24 and an obstacle or a raised portion of a field or pasture, or by operation of one or both of the lift control cylinders 74. In FIG. 7, a flow divider and control arrangement 150 of the invention (FIG. 5) can be disposed between valve V2 and the lower ends of cylinders 56 and 58, and will be operable in the below described manner.

Figure 8:
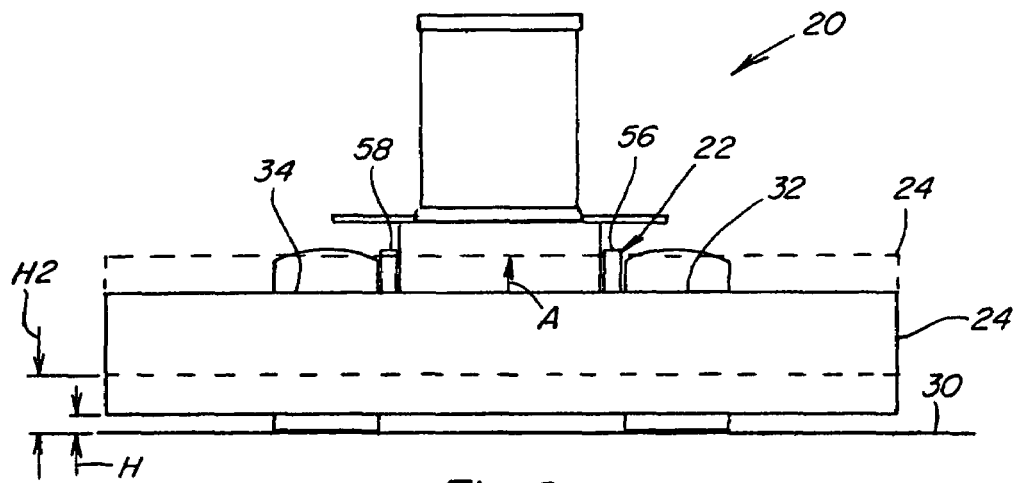
FIG. 8 is another simplified schematic front view of the machine of FIG. 1, showing the header in solid lines at a first selected height, and in dotted lines moved to a second selected height greater than the first height.
Figure 9:
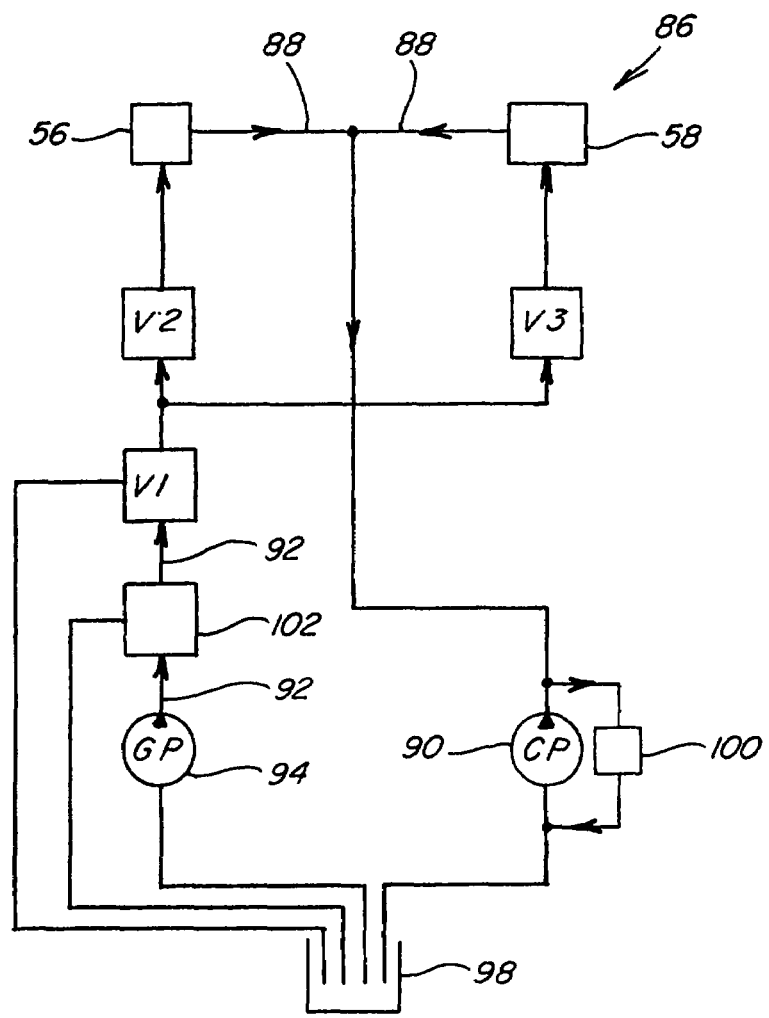
FIG. 9 is another simplified schematic representation of the fluid control circuit and apparatus of FIG. 5, in an operating mode for moving the header upwardly as illustrated in FIG. 8.

As another example, referring to FIG. 8, header 24 of machine 20 is illustrated in solid lines at height H above line 30, and in dotted lines evenly raised or lifted, as denoted by arrow A, to a new selected height H2 by operation of fluid control circuit 86 under control of switches 110 and 112 (FIGS. 1 and 5) simultaneously in an upwardly moving height setting mode, as illustrated in FIG. 9.

Referring to FIG. 9, in this height setting mode, charge pump 90 and gear pump 94 are again continuously operating to pump pressurized fluid, and unload/relief valve 102 and valve V1 are both commanded by controller 108 (FIG. 5) to be in operating states to allow pressurized fluid to flow from gear pump 94 through fluid lines 92 to valves V2 and V3. Valves V2 and V3 are commanded to open, to allow fluid flow to the lower ends of cylinders 56 and 58. This causes a displacement of fluid from the upper ends of cylinders 56 and 58 into lines 88, which is allowed as a result of the presence of relief valve 90, such that cylinders 56 and 58 are simultaneously retracted to lift both end portions 32 and 34 of header 24 simultaneously. In FIG. 9, the flow divider and control arrangement 150 (FIG. 5) of the invention can be disposed between valve V2 and the lower ends of cylinders 56 and 58, and will be operable in the below described manner.

Figure 10:
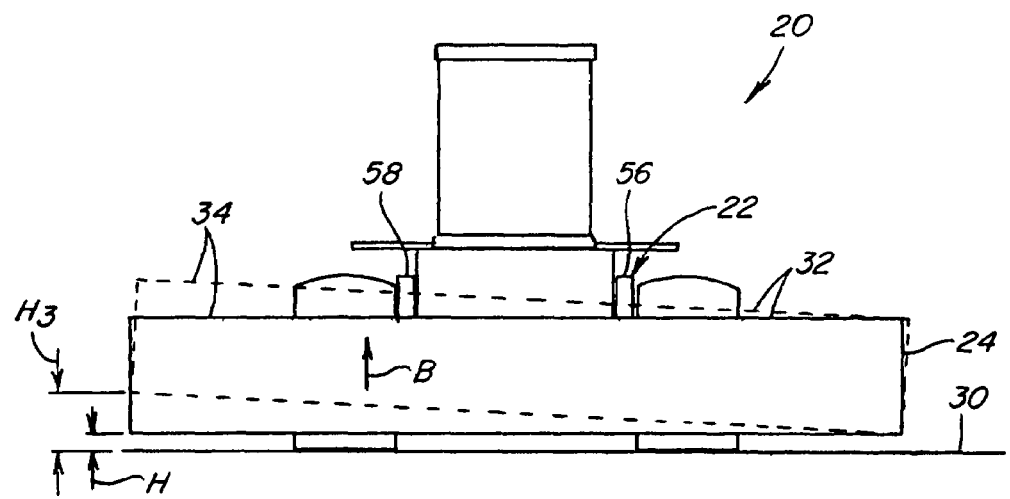
FIG. 10 is another simplified schematic front view of the machine of FIG. 1, showing the header thereof in solid lines at a selected level or even orientation in relation to a surface therebelow and in hidden lines oriented at an acute angle to the surface.
Figure 11:
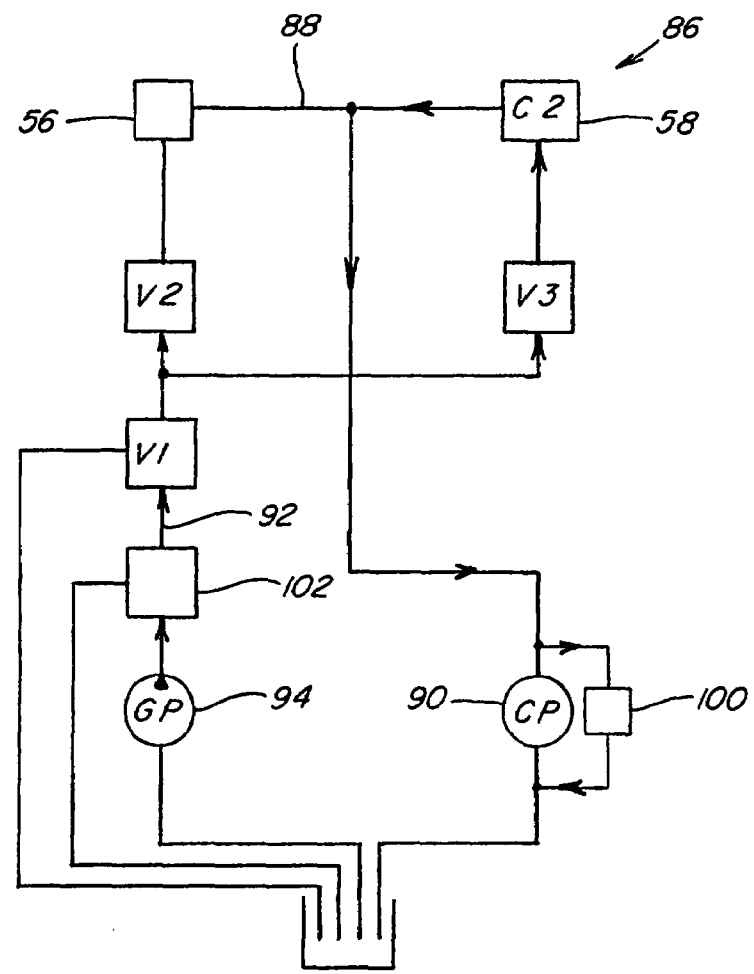
FIG. 11 is another simplified schematic representation of the fluid control circuit and apparatus of FIG. 5, in an operating mode for tilting the header as illustrated in FIG. 10.

In FIG. 10, machine 20 is shown with header 24 supported by cylinders 56 and 58 of system 22 in solid lines at height H, and in dotted lines tilted, as effected by tilting movement in the direction denoted by arrow B, such that end portion 34 thereof is raised to a height H3 above line 30, by operation of system 86 in a tilt setting mode. Referring also to FIG. 11, to effect a tilting movement such as shown in FIG. 10 under control of switches 110 and 112 (FIGS. 1 and 5), fluid control circuit 86 is controlled by controller 108 (FIG. 5) in a tilt setting mode wherein valves 102, V1 and V3 are commanded to open to allow fluid flow from gear pump 94 to the lower end of cylinder 58, to displace fluid from the upper end thereof to thereby retract that cylinder to effect an upward movement of end portion 34 (arrow B in FIG. 10). The tilting movement of header 24 in this manner can be facilitated by some upward movement of end portion 32 of header 24 as allowed by slotted connection 62 of cylinder 56, and/or, valve V2 can be opened to allow some retraction of cylinder 56 by a fractional portion of the retraction of cylinder 58, as required to raise end portion 32 as necessary to achieve a desired angle of tilt. Alternatively, cylinder 56 could be extended to lower end portion 32 to increase the angle of tilt. To facilitate the retraction of cylinder 58, fluid will be carried away through relief 100 as required. Again, in FIG. 11, flow divider and control arrangement 150 (FIG. 5) of the invention can be disposed between valve V2 and the lower ends of cylinders 56 and 58, and will be operable in the below described manner.

Figure 12:
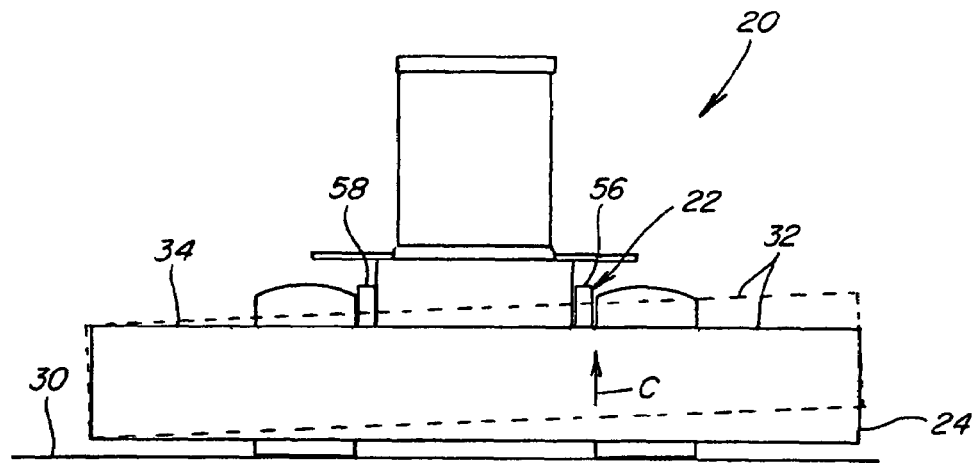
FIG. 12 is another simplified schematic front view of the machine, showing the header thereof at a level orientation in solid lines and tilted to an acute angle in dotted lines.
Figure 13:
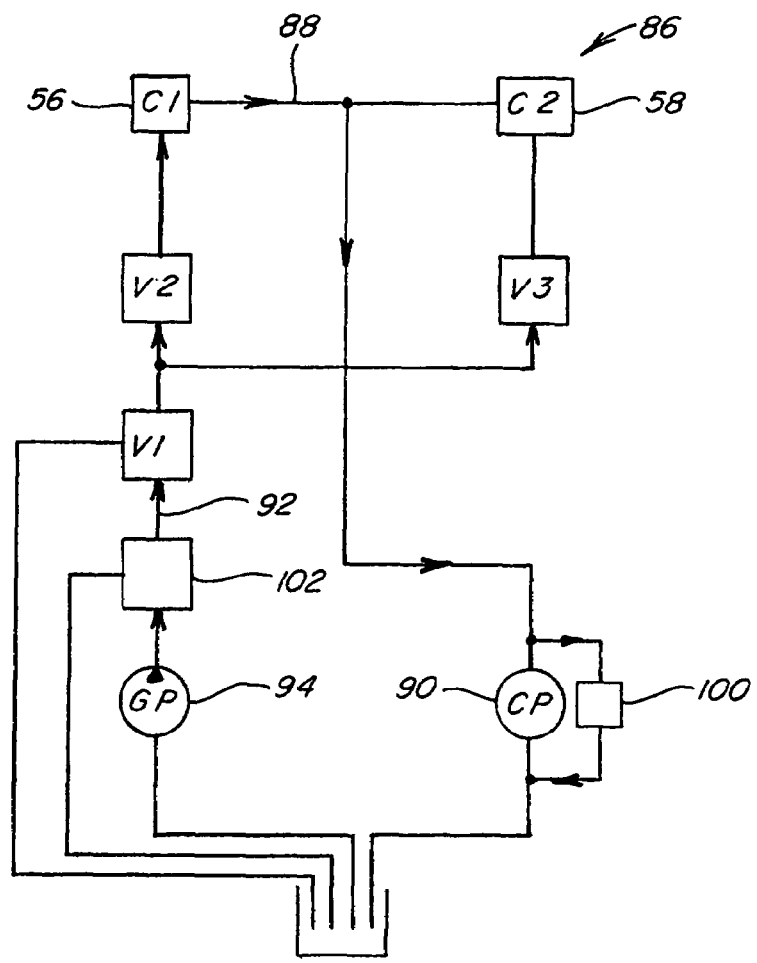
FIG. 13 is another simplified schematic representation of the operator control system and apparatus of FIG. 5 in an operating mode for tilting the header to a tilted position such as shown in FIG. 12.

In FIG. 12, machine 20 is shown with header 24 supported by cylinders 56 and 58 of system 22 in solid lines at an initially selected height, and in dotted lines tilted as denoted by arrow C in an opposite direction to that of FIG. 10, such that end portion 32 is instead raised in a tilt setting mode. Referring also to FIG. 13, to effect a selected tilting movement such as shown in FIG. 12, fluid control circuit 86 is operated in a tilt setting mode wherein valves 102, V1 and V2 are commanded to open to allow fluid flow from gear pump 94 to the lower end of cylinder 56, to displace fluid from the upper end thereof to thereby retract that cylinder to effect an upward movement of end portion 32. Here, it should be noted that by the tilting movement of header 24 can be facilitated by some upward movement of end portion 34 as allowed by slotted connection 62 of cylinder 58, and/or, cylinder 58 can be retracted by a fractional amount of the retraction of cylinder 56, as required to raise end portion 34 as necessary to achieve a desired angle of tilt. Cylinder 58 can also be extended to lower end portion 34 to increase the angle of tilt.

To facilitate the retraction of cylinder 56, fluid displaced from the upper end thereof will be carried away through relief 100 as required. Still again, in FIG. 13, flow divider and control arrangement 150 (FIG. 5) of the invention can be disposed between valve V2 and the lower ends of cylinders 56 and 58, and will be operable in the below described manner.

Regarding operation, referring again to FIG. 5, to lower header 24 to a lower selected height from any of the above described positions in a lowering height setting mode, valve 102 can be commanded to operate in its unload mode to discharge the output of gear pump 94 to reservoir 98, valve V1 can be commanded to open to connect valves V2 and V3 to line 104, and either or both of those valves opened to allow fluid to be displaced from the bottom of cylinder 56 and/or cylinder 58. It should also be noted that advantageously, valves V1, V2 and V3 can be optionally variably operable, to allow controlling and varying the speeds at which cylinders 56 and 58 are extended and retracted in the height and tilt setting modes.

Figure 14:
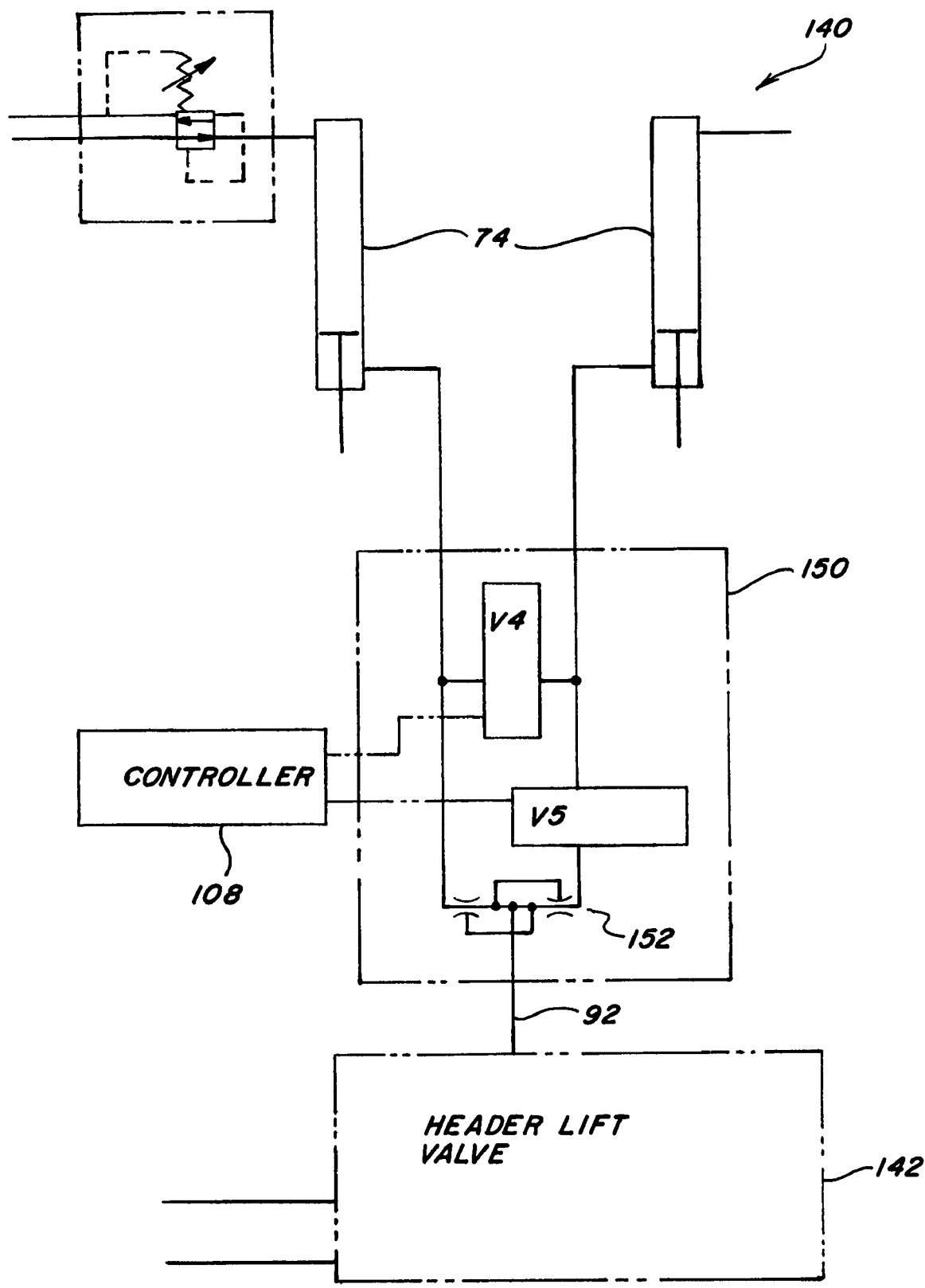
FIG. 14 is a simplified schematic of the flow divider and control valve arrangement of the present invention incorporated into a typical lift control system for use with any of the height control systems set forth above.
Figure 15:
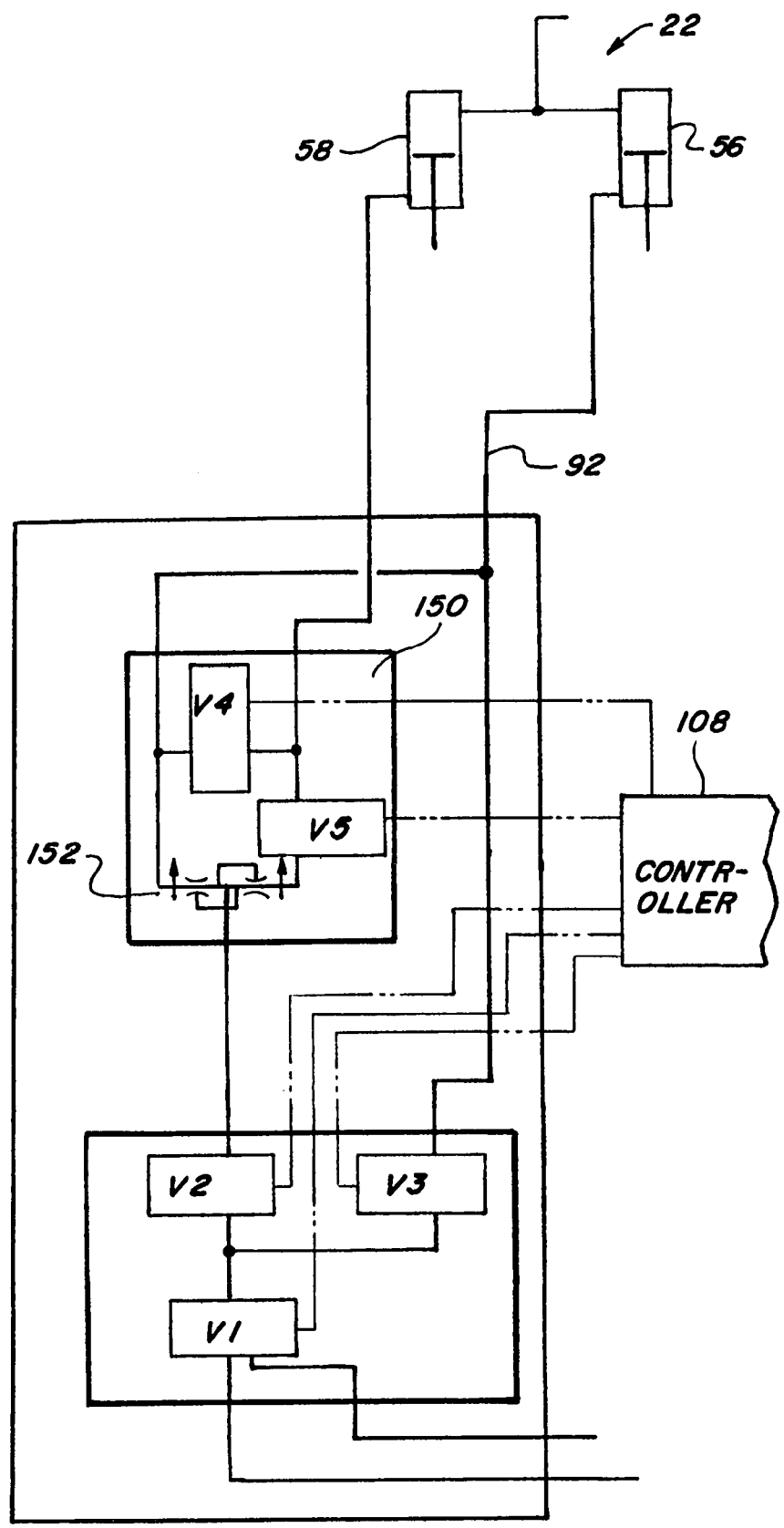
FIG. 15 is a simplified schematic of the flow divider and control valve arrangement of the invention, incorporated into a height control system representative of any of the systems set forth above.

To improve precision in operation of height control system 22 when controlling upward and downward movements of header 24, including tilting movements thereof, and to improve the ability to maintain and/or control the height of the end portions of the header particularly under dynamic loading conditions, such as when making rapid spin turns, a flow divider and control valve arrangement 150 constructed and operable according to the teachings of the present invention, can be incorporated into a height and/or lift control system, such as, but not limited to, height control system 22 described hereinabove. For a lift control system, such as those commonly used with auger type headers, the flow divider and control valve arrangement 150 is preferably incorporated into a header lift control cylinder circuit, as shown in FIG. 14. For a height control system, such as system 22 described hereinabove, having independent left and right lift systems, the flow divider and control valve arrangement is preferably incorporated as illustrated in FIGS. 5 and 15.

Referring more particularly to FIG. 14, flow divider and control valve arrangement 150 is illustrated incorporated into a representative lift control system 140 typical of a wide variety of known lift control systems utilizing lift control cylinders 74 connected in parallel to a control device such as a single header lift valve 142. Here, arrangement 150 is preferably disposed in connection with fluid path or lines 92 between valve 142 and cylinders 74. Arrangement 150 preferably includes a flow divider 152 configured and operable for allowing fluid flow in a predetermined manner to and from cylinders 74, which preferred manner can be, for instance, an equalized manner. Arrangement 150 includes a first control valve V4 disposed in a fluid path or line 92 in connection with both cylinders 74, and a second control valve V5 disposed in a fluid path or line 92 between flow divider 152 and one of the cylinders, here, the right-hand cylinder. Generally, control valves V4 and V5 are operable in a first mode wherein first control valve V4 is closed and second control valve V5 is open, to allow fluid flow to cylinders 74 in the predetermined manner. The control valves V4 and V5 are operable in a second mode wherein they are both open, to allow free fluid flow between cylinders 74. And, control valves V4 and V5 are operable in a third mode wherein both control valves V4 and V5 are closed, to prevent fluid flow to and from cylinders 74. Control valves V4 and V5 are preferably automatically controllably operable in the prescribed modes by a control system in connection therewith over a suitable conductive path, for instance, by controller 108, responsive to inputted operator commands for varying the length of the cylinders for raising and lowering the header.

Logic table 1 illustrates a representative automatic control scheme for valves V4 and V5 to automatically select or alternate between the first, second and third modes described hereinabove for use with the lift control system 140 shown in FIG. 14. As may be noted in the table, system 140 automatically controls valves V4 and V5 to operate in the first mode, allowing fluid flow to and from cylinders 74 through flow divider 152, during a header lift or lower operation as well as during a header height control command. System 140 automatically controls valves V4 and V5 to operate in the second mode, allowing fluid to freely flow to, from, and between cylinders 74, during a number of situations. When cylinders 74 are fully extended or retracted, which typically occurs after a two second sustained lift or lower command, the free fluid flow allows cylinders 74 to rephase or equalize. In addition, free flow of fluid between cylinders 74 is also desirable during a float mode, header lateral tilt and the header remove mode. Finally, system 140 automatically controls valves V4 and V5 to operate in the third mode, preventing fluid flow to, from, and between cylinders 74 when cylinders 74 are to remain at the same length, such as after a lift command is released. This ability to lock cylinders 74 at a particular length is especially desirable to prevent header lean during a rapid spin turn at the end of a row or swath of a field.

LOGIC TABLE 1

Four Cylinder Flow Divider Control Logic

| Operation | V4 | V5 | Mode |
|---|---|---|---|
| Start of Lift | | X | $1^{st}$ |
| Lift After 2 sec | X | X | $2^{nd}$ |
| Lift Command Released | | | $3^{rd}$ |
| Start of Lower | | X | $1^{st}$ |
| Lower After 2 sec | X | X | $2^{nd}$ |
| Float Mode | X | X | $2^{nd}$ |
| Header Height Up | | X | $1^{st}$ |
| Header Height Down | | X | $1^{st}$ |
| Header Height Lateral Tilt | X | X | $2^{nd}$ |
| Header Remove Mode | X | X | $2^{nd}$ |

Wherein X denotes that the valve is open.

Referring more particularly to FIG. 15, flow divider and control valve arrangement 150 is illustrated incorporated into a representative height control system 22 as described hereinabove. Here, arrangement 150 is preferably disposed in connection with fluid path or lines 92 between valve V2 and cylinders 58 and 58. Arrangement 150 preferably includes a flow divider 152 configured and operable for allowing fluid flow in a predetermined manner to and from cylinders 56 and 58, which preferred manner can be, for instance, an equalized manner. Arrangement 150 includes a first control valve V4 disposed in a fluid path or line 92 in connection with both cylinders 56 and 58, and a second control valve V5 disposed in a fluid path or line 92 between flow divider 152 and cylinder 58. Generally, control valves V4 and V5 are operable in a first mode wherein first control valve V4 is closed and second control valve V5 is open, to allow fluid flow to cylinders 56 and 58 in the predetermined manner. The control valves V4 and V5 are operable in a second mode wherein they are both open, to allow free fluid flow between cylinders 56 and 58. And, control valves V4 and V5 are operable in a third mode wherein both control valves V4 and V5 are closed, to prevent fluid flow to and from cylinders 56 and 58. Control valves V4 and V5 are preferably automatically controllably operable in the prescribed modes by a control system in connection therewith over a suitable conductive path, for instance, by controller 108, responsive to inputted operator commands for varying the length of the cylinders for raising and lowering the header.

Logic table 2 illustrates a representative automatic control scheme for valves V4 and V5 to automatically select or alternate between the first, second and third modes described hereinabove for use with the height control system 22 shown in FIG. 15. As may be noted in the table, system 22 automatically controls valves V4 and V5 to operate in the first mode, allowing fluid flow to and from cylinders 56 and 58 through flow divider 152, during a header height raise or lower command. System 22 automatically controls valves V4 and V5 to operate in the second mode, allowing fluid to freely flow to, from, and between cylinders 56 and 58, when cylinders 56 and 58 are fully extended or retracted, which typically occurs after a four and a half second sustained lift command or five and a fourth second sustained lower command. The free fluid flow allows cylinders 56 and 58 to rephase or equalize. In addition, free flow of fluid between cylinders 56 and 58 is also desirable during a header remove mode. Finally, system 22 automatically controls valves V4 and V5 to operate in the third mode, preventing fluid flow to, from, and between cylinders 56 and 58 when cylinders 56 and 58 are to remain at the same length, such as during a lateral tilt and after a height control command is released. This ability to lock cylinders 56 and 58 at a particular length is especially desirable to prevent header lean during a rapid spin turn at the end of a row or swath of a field.

LOGIC TABLE 2

Six Cylinder Flow Divider Control Logic

| Function | V1 | V2 | V3 | V4 | V5 | Mode |
|---|---|---|---|---|---|---|
| Raise Height | X | X | | | X | $1^{st}$ |
| Raise After 4.5 sec | X | X | | X | X | $2^{nd}$ |
| Lower Height | | X | | | X | $1^{st}$ |
| Lower after 5.25 sec | | X | | X | X | $2^{nd}$ |
| CCW Lateral Tilt | X | | X | | | $3^{rd}$ |
| CW Lateral Tilt | | | X | | | $3^{rd}$ |
| Header Remove Mode | | X | X | X | X | $2^{nd}$ |

Wherein X denotes that the valve is open.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A control system for a header of a work machine, comprising:

a header support apparatus connecting a header to a frame of a work machine, the apparatus including first and second control cylinders disposed in supporting relation to opposite first and second end portions of the header, respectively, the control cylinders being controllably variable in length for supporting the first and second end portions of the header at selectable heights relative to the frame, respectively;

a flow divider and control valve arrangement disposed in fluid paths in connection with the first and second control cylinders, including a flow divider configured and operable for allowing fluid flow in a predetermined manner to the control cylinders, a first control valve disposed in a fluid path in connection with both of the first and second control cylinders, and a second control valve disposed in a fluid path between the flow divider and one of the control cylinders; the control valves being operable in a first mode wherein the first control valve is closed and the second control valve is open, to allow fluid flow to and from the control cylinders in the predetermined manner; the control valves being operable in a second mode wherein the first and the second control valves are open, to allow free fluid flow between the control cylinders; and the control valves being operable in a third mode wherein both the first control valve and the second control valve are closed, to prevent fluid flow to and from the cylinders;

a control system in connection with the control valves and automatically operable for controlling the first and the second control valves in the first mode, the second mode, and in the third mode, respectively, the control system configured to place the valves in the second mode both when at least one of the cylinders is fully extended or when at least one of the cylinders is fully retracted, a second control valve arrangement having third, fourth and fifth control valves, the third control valve disposed in a fluid path between a pump and the fourth and fifth control valves, the fourth and fifth control valves disposed in parallel fluid paths such that the fourth control valve is between the third control valve and the first control valve arrangement; and the fifth control valve is between the third control valve and the first cylinder.

2. The system of claim 1, wherein the flow divider is automatically operable to distribute flow substantially equally between the control cylinders.

3. The system of claim 1, wherein the control system is programmed for automatically controlling the first and the second control valves in the first mode for a predetermined period, and then in the second mode, responsive to a command for operating the control cylinders in a lift or a lower mode, for a sustained period of time.

4. The system of claim 1, wherein the control system is programmed for automatically controlling the first and the second control valves in the second mode, responsive to a command for operating the control cylinders in a lateral tilt mode.

5. The system of claim 1, wherein the control system is programmed for automatically controlling the first and the second control valves in the second mode, responsive to a command for operating the control cylinders in a header remove mode.

6. The system of claim 1, wherein the control system is programmed for automatically controlling the first and the second control valves in the third mode, responsive to a release of a command for operating the control cylinders in a lift or a lower mode.

7. The system of claim 1, wherein the control system is programmed for automatically controlling the first and the second control valves in the third mode, responsive to a command for operating the control cylinders in a lateral tilt mode.

8. The control system of claim 1, further comprising:

at least one lift cylinder connected between the frame and the header support configured for lifting and lowering the header between multiple heights; and the first and second cylinders are height control cylinders configured for establishing a returnable position of the header above the ground upon upward movement of the header by the at least one lift cylinder.

9. A method for controlling the height of a header of a work machine, comprising the steps of;

providing a header support apparatus connecting a header to a frame of a work machine, the apparatus including first and second control cylinders disposed in supporting relation to opposite first and second end portions of the header, respectively, the control cylinders being controllably variable in length for supporting the first and second end portions of the header at selectable heights relative to the frame, respectively;

providing a control arrangement disposed in fluid paths in connection with the first and second control cylinders, including a flow dividing element operable for allowing fluid flow in a predetermined manner to the control cylinders, a first control element disposed in a fluid path in connection with both of the first and second control cylinders, and a second control element disposed in a fluid path between the flow divider and one of the control cylinders; the control elements operable in a first mode to allow fluid flow to and from the control cylinders in the predetermined manner; the control elements being operable in a second mode to allow free fluid flow between the control cylinders; and the control elements being operable in a third mode to prevent fluid flow to and from the cylinders;

providing a control system in connection with the control elements automatically operable for controlling the first and the second control elements in the first mode, the second mode, and in the third mode, respectively the control system configured to place the valves in the second mode both when at least one of the cylinders is fully extended or when at least one of the cylinders is fully retracted;

providing a second control arrangement having third, fourth and fifth control elements, the third control element disposed in a fluid path between a pump and the fourth and fifth control, element, the fourth arid fifth control element disposed in parallel fluid paths such that the fourth control element is between the third control element and the first control arrangement; and the fifth control element is between the third control element and the first cylinder.

10. The method of claim 9, wherein the flow dividing element automatically distributes flow substantially equally between the control cylinders.

11. The method of claim 9, wherein the control system automatically controls the first and the second control elements in the first mode for a predetermined period, and then in the second mode, responsive to a command for operating the control cylinders in a lift or a lower mode, for a sustained period of time.

12. The method of claim 9, wherein the control system automatically controls the first and the second control elements in the second mode, responsive to a command for operating the control cylinders in a lateral tilt mode.

13. The method of claim 9, wherein the control system automatically controls the first and the second control elements in the second mode, responsive to a command for operating the control cylinders in a header remove mode.

14. The method of claim 9, wherein the control system automatically controls the first and the second control elements in the third mode, responsive to a release of a command for operating the control cylinders in a lift or a lower mode.

15. The method of claim 9, wherein the control system controls the first and the second control elements in the third mode, responsive to a command for operating the control cylinders in a lateral tilt mode.

* * * * *